United States Patent
Achterman

(10) Patent No.: US 7,552,743 B1
(45) Date of Patent: Jun. 30, 2009

(54) SELF CLEANING FLOW SHUTOFF VALVE

(75) Inventor: Kermit L. Achterman, LaCanada Flintridge, CA (US)

(73) Assignee: Kermit L. Achterman & Associates, Inc., La Canada Flintridge, CA (US)

( * ) Notice: Subject to any disclaimer, the term of this patent is extended or adjusted under 35 U.S.C. 154(b) by 191 days.

(21) Appl. No.: 11/535,194

(22) Filed: Sep. 26, 2006

(51) Int. Cl.
*F16K 17/30* (2006.01)

(52) U.S. Cl. .................. 137/460; 137/498; 137/514.5; 137/516.27

(58) Field of Classification Search ............ 137/516.13, 137/516.17, 519, 514, 512, 540, 853, 514.5, 137/516.25, 516.27, 460, 498, 517; 251/149.6
See application file for complete search history.

(56) References Cited

U.S. PATENT DOCUMENTS

| | | | |
|---|---|---|---|
| 735,248 A | 8/1903 | Hahn | |
| 1,796,455 A | 3/1931 | Gunn et al. | |
| 2,307,949 A | 1/1943 | Phillips | |
| 2,415,258 A | 2/1947 | Parker et al. | |
| 2,460,407 A * | 2/1949 | Andrus | 138/46 |
| 2,481,713 A | 9/1949 | Bertea | |
| 2,633,147 A * | 3/1953 | Badami | 137/506 |
| 2,912,000 A | 11/1959 | Green | |
| 2,924,237 A | 2/1960 | Ellis | |
| 3,441,052 A | 4/1969 | Schilling | |
| 3,566,918 A * | 3/1971 | Rauen | 137/614.04 |
| 3,664,371 A | 5/1972 | Schneider | |
| 3,735,777 A | 5/1973 | Katzer et al. | |
| 3,850,195 A | 11/1974 | Olsson | |
| 3,958,603 A | 5/1976 | Bannon et al. | |
| 5,240,036 A * | 8/1993 | Morris | 137/514.7 |
| 5,487,406 A * | 1/1996 | Jirasek | 137/519 |
| 5,857,716 A * | 1/1999 | Thomas | 285/143.1 |

(Continued)

OTHER PUBLICATIONS

Non-Final Office Action from USPTO dated Oct. 7, 2008 for relating U.S. Appl. No. 11/689,104.

(Continued)

*Primary Examiner*—John Rivell
*Assistant Examiner*—Macade Brown
(74) *Attorney, Agent, or Firm*—Klein, O'Neill & Singh, LLP

(57) ABSTRACT

A flow shut off valve for residential water line pressure includes a housing having an inlet, an outlet and a passage there between with a valve seat in the passage. A valve element is slidably mounted within the passage and includes a cavity open to the inlet and orifices partially restricting flow from the cavity to the passage. A spring biases the valve element toward the inlet. Reduced back pressure at the outlet drives the valve element into a closed position with a sealing surface against the valve seat to terminate flow. The restrictive orifices in the valve element extend from the cavity to the periphery of the valve element and, in a position toward the inlet, the restrictive orifices are closed by the housing to block communication between the inlet and the outlet. In an intermediate position, the orifices are open and the sealing surface is not against the valve seat. A motion damper may be employed to allow for start-up conditions on sprinkler systems and the like. The flow shutoff valves are contemplated for employment with household appliances using water and sprinkler systems.

18 Claims, 5 Drawing Sheets

U.S. PATENT DOCUMENTS 5,976,631 A * 11/1999 Ramachandran ......... 427/207.1
6,325,090 B1   12/2001 Horne et al.
6,513,543 B1   2/2003  Noll et al.
7,111,638 B2   9/2006  Johnson

OTHER PUBLICATIONS

Notice of Allowance from USPTO received on Nov. 13, 2008 for relating U.S. Appl. No. 12/170,721.
Final Office Action from USPTO dated Apr. 13, 2009 for relating U.S. Appl. No. 11/689,104.

* cited by examiner

SELF CLEANING FLOW SHUTOFF VALVE

BACKGROUND OF THE INVENTION

The field of the present invention is flow shutoff valves for residential water line pressure.

Shutoff valves to prevent excess flow, such as when a sudden leak occurs downstream of the valve, are well known in the art. Such valves are found in high pressure hydraulic systems, fueling systems and critical gas systems. Such valves are relatively expensive because of complicated housings and/or valve elements, the materials, and their precision machining requirements.

Household appliances which use water such as a washing machine are most often connected to manual shutoff valves which are installed in the home. The conventional means for connecting the manual shutoff valves to an appliance are typically through flexible hoses. Personal experience and insurance statistics suggest that a great many such manual shutoff valves are not closed when the appliance is not in use. Consequently, the integrity of the flexible hoses remains the only means of containing a household system water pressure to an appliance. Insurance companies in North America report payments amounting to hundreds of millions of dollars annually which solely result from broken household appliance hoses.

The shutoff valves used for hydraulics, fuels and gasses are out of practical range for use with home appliances. However, other solutions have been applied to the problem of residential flooding from appliance hoses in a number of ways. Electrical sensors, timers and valve drives have been devised. Mechanical devices have also been employed which are complicated, expensive and/or limited in their use.

One problem which must be addressed by shutoff devices for residential use is the presence of particles and hardness in the water supply which can accumulate to disable such valves. The utility of most shutoff valves is as an emergency device with very infrequent actuation. Consequently, interfering deposits can be built up with continued flow through the valve without actuation and result in malfunction of the valve when needed.

SUMMARY OF THE INVENTION

The present invention is directed to a flow shutoff valve for residential water line pressure and includes a housing, a valve element slidably mounted in the housing and a spring biasing the valve element. The housing includes a passage therethrough with at least a first cylindrical section. The valve element includes a sealing surface which is engageable with a valve seat about the passage in the housing. A flow restrictive passage is located between the inlet and the outlet with communication therethrough controlled by the valve element.

In a first separate aspect of the present invention, the valve element includes a cylindrical wall slidably engaging the first cylindrical section of the passage through the housing. Communication through the flow restrictive passage is closed with the valve element at the inlet end of its slidable mounting. Under this condition, the valve element operates as a piston through a distance responsive to the water pressure each time water begins to flow through the valve, performing a forced physical cleaning.

In a second separate aspect of the present invention, the valve element includes a cavity open to the inlet. The flow restrictive passage includes at least one restrictive orifice extending from the cavity to the periphery of the valve element. The restrictive orifice(s) is closed by the first cylindrical section with the valve element at the inlet end of its slidable mounting.

In a third separate aspect of the present invention, back pressure at the outlet dropping to near zero gauge pressure results in a force on the valve element greater than and opposed to the force of the spring. Further, the spring has a spring force with the valve element in the no-flow position which is less than the total force of the water line pressure on the valve element with the back pressure of the outlet at near zero gauge pressure.

In a fourth separate aspect of the present invention, the flow shutoff valve includes a motion damper operatively coupled between the housing and the valve element. This damper may include damping which is progressive with displacement. The motion damper may include a cavity and a plunger. The plunger can have an increasing cross-sectional area with increasing distance from the free end of the plunger for a first length of the plunger.

In a fifth separate aspect of the present invention, the flow shutoff valve includes a flexible hose having a proximal end attached to the outlet and a distal end, a line filter adjacent the distal end of the flexible hose and no line filter adjacent the proximal end of the hose or the flow shutoff valve.

In a sixth separate aspect of the present invention, any of the foregoing aspects are contemplated to be employed in combination to greater utility.

Accordingly, it is an object of the present invention to provide an improved flow shutoff valve. Other and further objects and advantages will appear hereinafter.

DETAILED DESCRIPTION OF THE PREFERRED EMBODIMENTS

Figure 1:
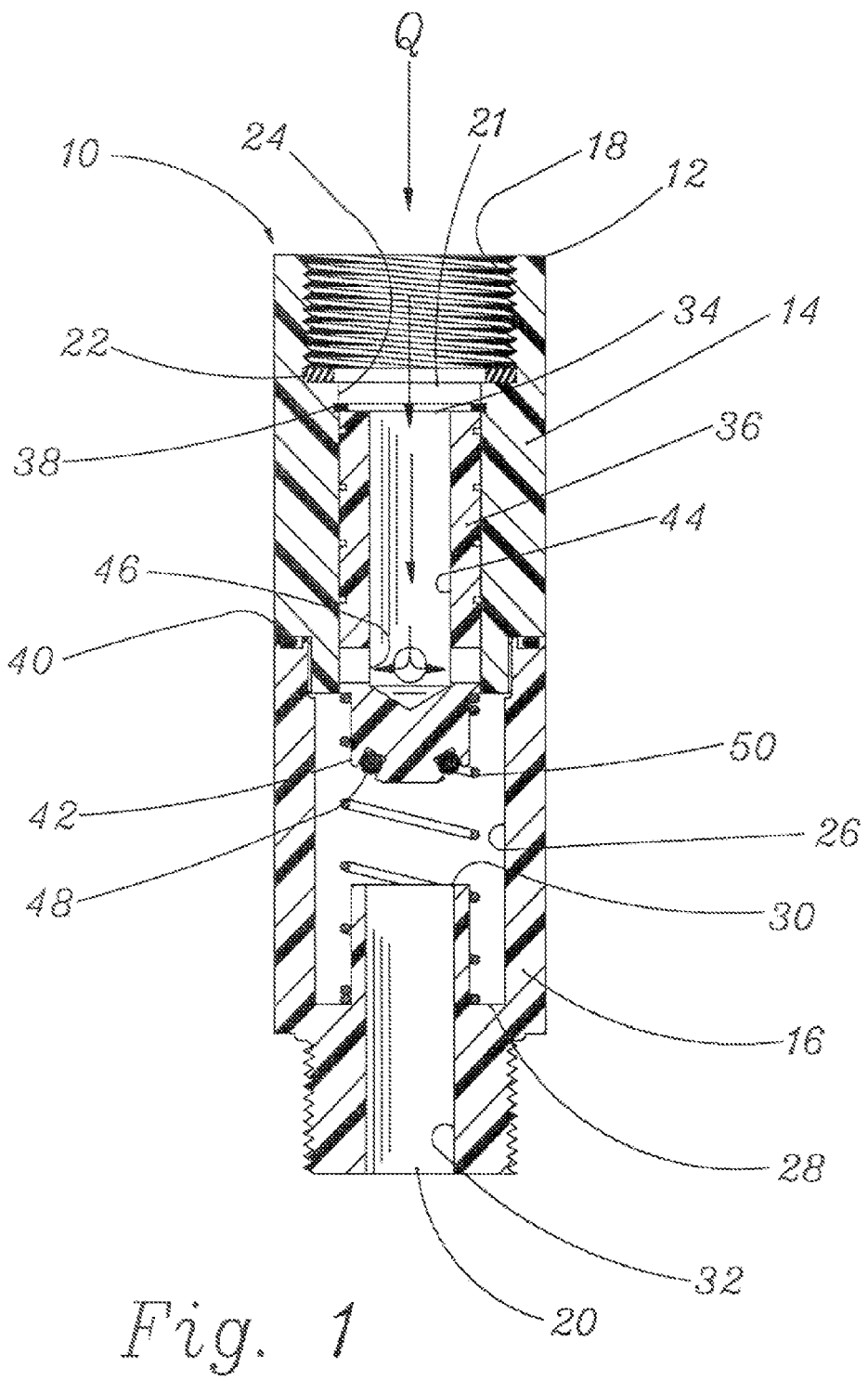
FIG. 1 is a cross-sectional view taken along the centerline of a flow shutoff valve in a position with no flow therethrough.
Figure 2:
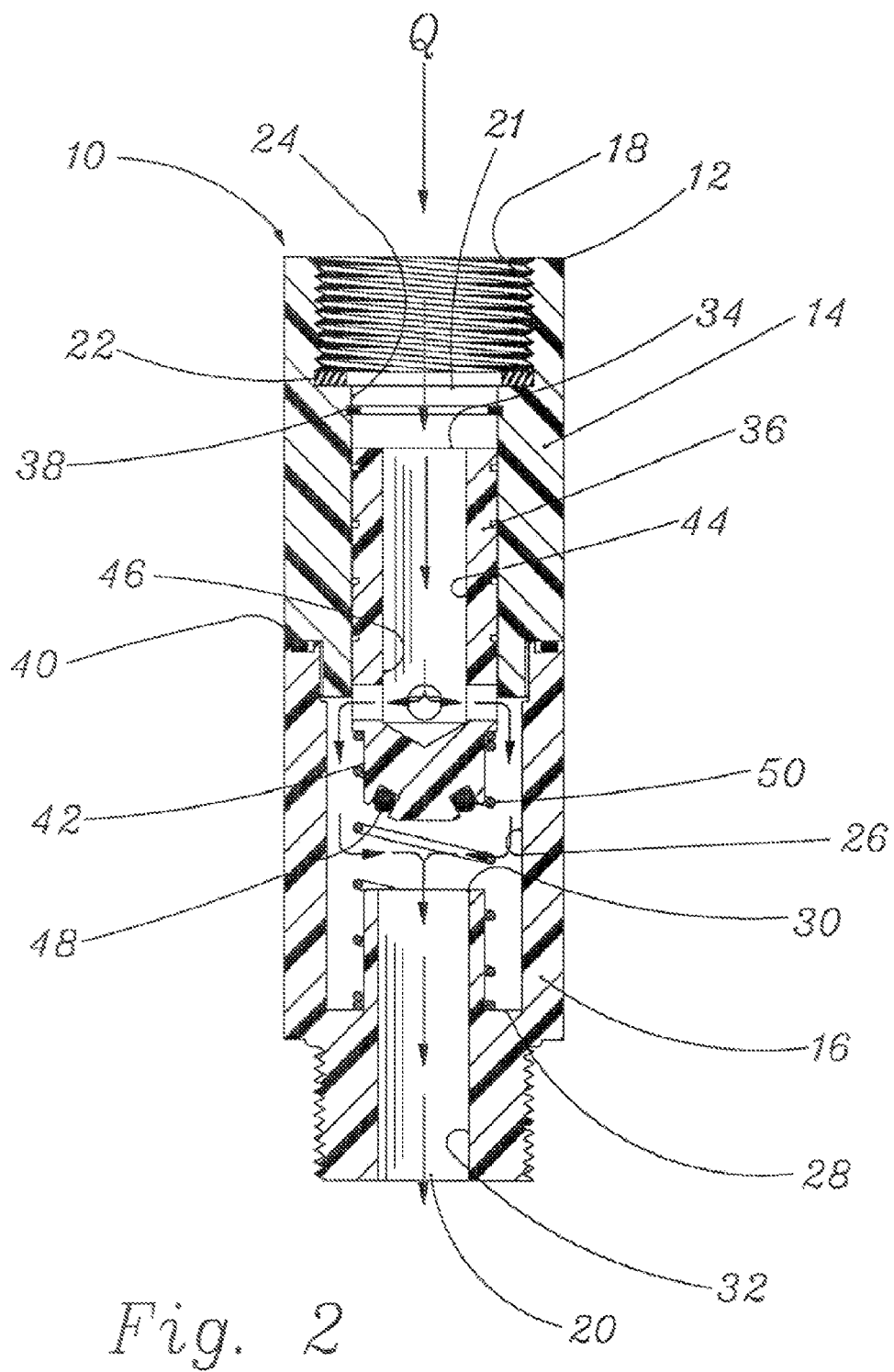
FIG. 2 is a cross-sectional view taken along the centerline of the flow shutoff valve in an intermediate position with flow therethrough.
Figure 3:
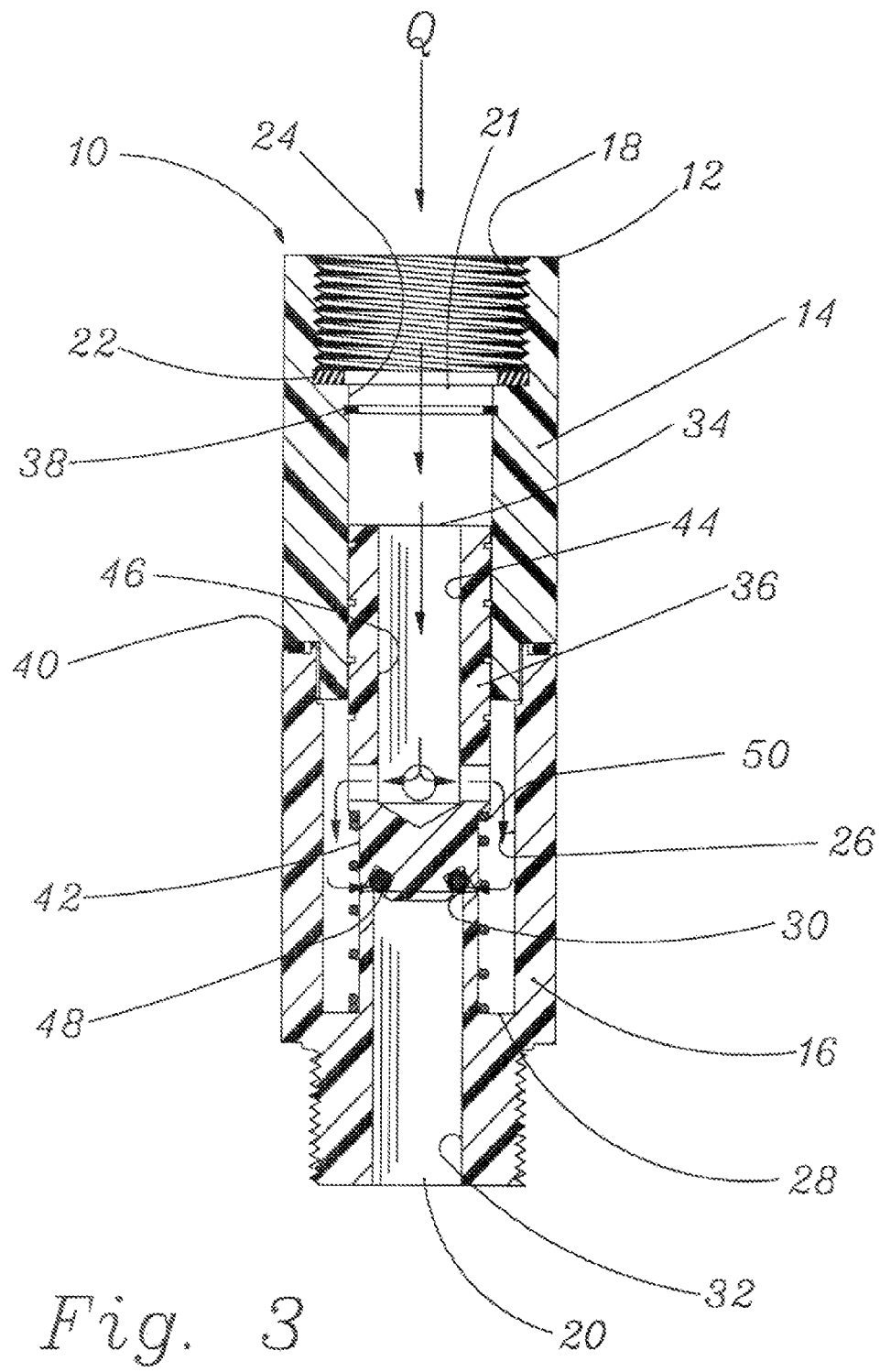
FIG. 3 is a cross-sectional view taken along the centerline of a flow shutoff valve in a shutoff position.

Turning in detail to FIGS. 1 through 3, a self cleaning flow shutoff valve for residential water line pressure is disclosed. The flow shutoff valve, generally designated 10, includes a housing 12. The housing 12 is constructed of an inlet section 14, and an outlet section 16. These sections may conveniently be of inexpensive plastic molding material. Such materials include polyvinyl chloride (PVC), chlorinated polyvinyl chloride (CPVC), acrylonitrile butadiene styrene (ABS) and other plastics. Brass or bronze may alternatively be employed. The sections 14, 16 are generally cylindrical. "Cylindrical" is used herein in the broader mathematical sense without necessarily being limited to a circular cylinder.

The inlet section 14 includes an inlet 18. The outlet section 16 includes an outlet 20. The inlet 18 and outlet 20 sections are shown to be threaded with female and male threads, respectively. The entire body of the housing 12 is preferably cylindrical at any cross section and the two sections 14, 16 include male and female engaged pilot diameters. The two sections 14, 16 may be bonded together or threaded together with an o-ring seal 40.

The resulting housing 12 defined by the two sections 14, 16 includes a passage 21 therethrough extending from the inlet 18 to the outlet 20. The passage 21 includes a washer 22 arranged at the inlet to prevent flow from backing out through the inlet 18.

The passage 21 further includes a cylindrical section 24 found inwardly of the inlet 18 and washer 22. This section 24 extends to a central section 26 of enlarged cross section also forming part of the passage 21. At one end of the central section 26, an annular spring seat 28 is arranged to accommodate a spring inwardly displaced from the wall of the passage 21 at the central section 26. A valve seat 30 is also located in the central section 26 at the annular spring seat 28. The valve seat 30 extends around the passage 21 as it defines an outlet channel 32.

A valve element 34 includes a cylindrical wall about its periphery which slidably engages the cylindrical section 24. The body 36 of the valve element 34 is of sufficient length and fit so that it will not bind with the cylindrical bore 24 in movement within the passage 21 and yet precludes any substantial flow between the cylindrical wall and the cylindrical section 24. The clearance between the body 36 and the cylindrical bore 24 is small but does not require that all fluid flow therebetween be prevented. A retaining ring 38 fits within a groove in the passage 21 at the first section 24. A spring clip may be employed for this ring 38. This limits the travel of the valve element 34 toward the inlet 18. A nose 42 of smaller diameter than the body 36 extends downwardly below the cylindrical wall of the body 36.

A flow restrictive passage is located between the inlet and the outlet with communication therethrough controlled by the valve element 34. In the preferred embodiment, the flow restrictive passage is defined by a central cavity 44 extending into the body of the valve element 34 from the inlet end. The cavity 44 does not extend fully through the valve element 34. Rather, several orifices 46 extend from the cavity 44 in a radial direction to the periphery of the valve element 34 for communication between the inlet and the outlet. Further the central section 26 can provide communication from the orifices 46 to the valve seat 30. A sealing surface 48 is arranged on the end of the nose 42 to cooperate with the valve seat 30 for closure of the passage 21.

A spring 50 is positioned in the annular spring seat 28 and is placed in compression against the shoulder created by the diameter change in the valve element 34. The spring 50 biases the valve element 34 toward the inlet and against the retaining ring 38.

In comparing FIGS. 1, 2 and 3, it may be noted that the valve element 34 is shown in three functional positions. A first position, as illustrated in FIG. 1, is with the valve element 34 positioned fully toward the inlet 18. A second position, as illustrated in FIG. 2, is an intermediate position with the orifices 46 in communication with the central section 26 and the valve 10 open. The second position actually spans a range of locations for the valve element 34. A third position, as illustrated in FIG. 3, is with the sealing surface 48 pressed against the valve seat 30. In the first position, the orifices 46 are closed by the cylindrical section 24 which closely surrounds the cylindrical periphery of the valve element 34. In this way, communication through the flow restrictive passage is closed. With no open passage, pressure builds up on the top of the valve element 34 which in turn acts as a piston and is forced downwardly by the water pressure every time the valve is opened. With the added force of the piston, the valve element 34 is cleared of any accumulation of particles and hardness on a regular basis. Further, the valve remains open with the sealing surface 48 displaced from the valve seat 30.

In the second position, flow proceeds relatively unimpeded by the mechanism with the exception of the design of the orifices 46. Under normal flow conditions, the valve element 34 remains in this intermediate position.

In the third position, the sealing surface 48 is on the valve seat 30 and there is no flow. It is through this range of positions that the flow shutoff valve 10 operates.

The spring 50 and the orifices 46 are empirically selected to accommodate residential water line pressure and household appliance flow rates. At normal flow, there is some pressure drop across the valve element 34. This pressure drop is due to flow resistance through the orifices 46 and general drag on the valve element 34. This pressure drop along with pressure imbalances resting from velocity variations around the valve element 34 provide differential forces on the valve element 34. However, the orifices 46 and the spring 50 are selected to allow a certain range of flow through the flow shutoff valve 10 at a range of line pressures with the spring 50 retaining the valve element 34 in the intermediate zone of positions. This is accomplished by having the spring maintain a range of force on the valve element 34 that the hydraulic forces do not move the valve element 34 fully to the third position against the valve seat 30. Naturally, the spring 50 cannot resist the piston action of the valve element 34 as it moves from the first position to expose the orifices 46. As the residential water line pressure is reasonably stable during such flow, the back pressure at the outlet 20 significantly determines flow rate. This back pressure is developed at an appliance or other device in fluid communication with the outlet 20.

When the back pressure at the outlet 20 drops significantly, the differential pressure between the inlet 18 and the outlet 20 becomes substantially greater. In response, flow through the flow shutoff valve 10 increases. As the flow increases, greater resistance is provided by the orifices 46. Resulting hydraulic forces acting in the direction of flow increase. At a flow rate between 150% and 200% of anticipated normal flow, the resulting hydraulic force on the valve element 44 exceeds the opposing spring force from the compressed spring 50. Preferably the spring 50 is arranged such that the distance between the first and third positions does not greatly increase the spring force. This is accomplished with some precompression of the spring 50 in the first position and a small spring constant. With the resulting hydraulic force exceeding the spring force, the valve element 34 will move to the third position with the sealing surface 48 against the annular valve seat 30. As the sealing surface 48 engages the valve seat 30, flow is terminated.

Once there is no flow, the pressure about the valve element 34 equalizes at the line pressure. At this point, the only forces on the valve element 34 are the spring 50 and the imbalance between the line pressure and the lower pressure at the outlet channel 32 operating on the valve element 34 inwardly of the valve seat 30. With the outlet 20 being near zero gauge pressure, the differential pressure across the area of the outlet channel 32 retains the valve element 34 in the third position. Reinstating the flow shutoff 10 to the first or second positions is accomplished by reducing the line pressure sufficiently so that the spring 50 may force the valve element 34 back toward the inlet 18.

Figures 4, 5:
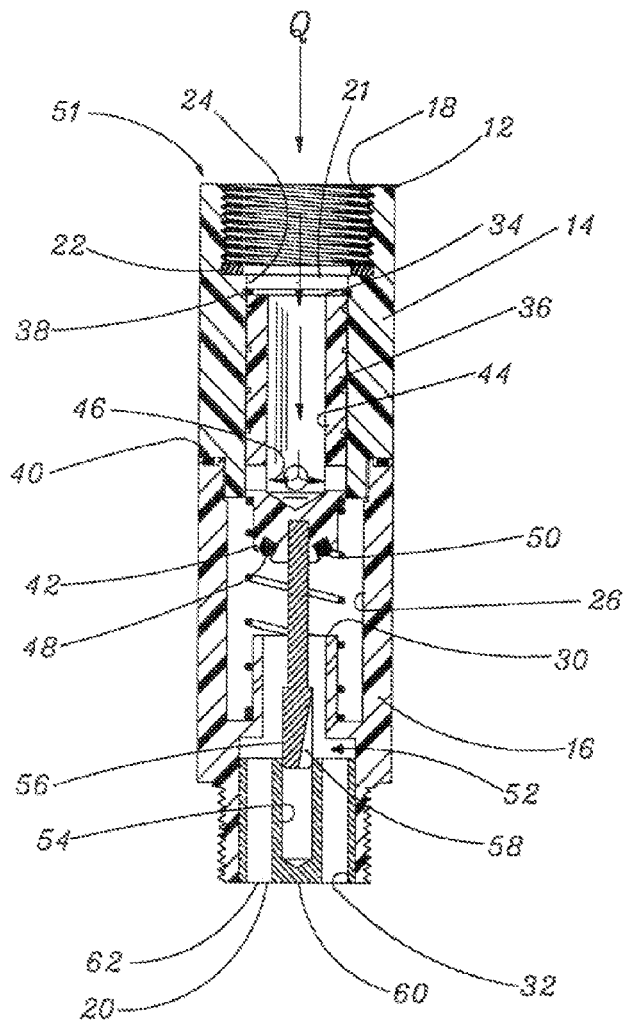
FIG. 4 is a bottom view of a second embodiment of a flow shutoff valve.
FIG. 5 is a cross-sectional view taken along lines 5-5 of FIG. 4.

The second embodiment illustrated in FIGS. 4 and 5 includes the reference numbers applied to the first embodiment where functions are substantially identical. This second embodiment of the flow shutoff valve, generally designated 51, principally differs in the provision of a motion damper, generally designated 52. The motion damper includes a cavity 54 associated with the housing 12 and a plunger 56 associated with the valve element 34. The first position of the valve element 34 as seen in FIG. 5, has the plunger 56 just entering the cavity 54. In the intermediate position, the plunger 56 has more fully entered into the cavity 54 but has not bottomed out.

For a first distance, the plunger 56 increases in cross-sectional area by means of the chamfer 58. With this device, the damping resistance is progressive with displacement of the valve element 34 from the intermediate position toward the valve closed position.

To accommodate the motion damper 52, the housing 12 includes an insert 60 centrally defining the cavity 54 with multiple ports 62 thereabout. The ports are substantially larger in cumulative cross-section than the orifices 46. This allows a rapid drop in pressure below the valve element 34 with resulting closure of the shutoff valve 51 when pressure at the outlet 20 drops to near zero gauge. The insert 60 may be press fit or retained by bonding. A further variation from the first embodiment may be the employment of slip sockets, as the shutoff valve 51 is depicted in FIG. 7, particularly adaptable with PVC, CPVC and ABS type piping systems for bonding of the system components to the valve 51.

Figure 6:
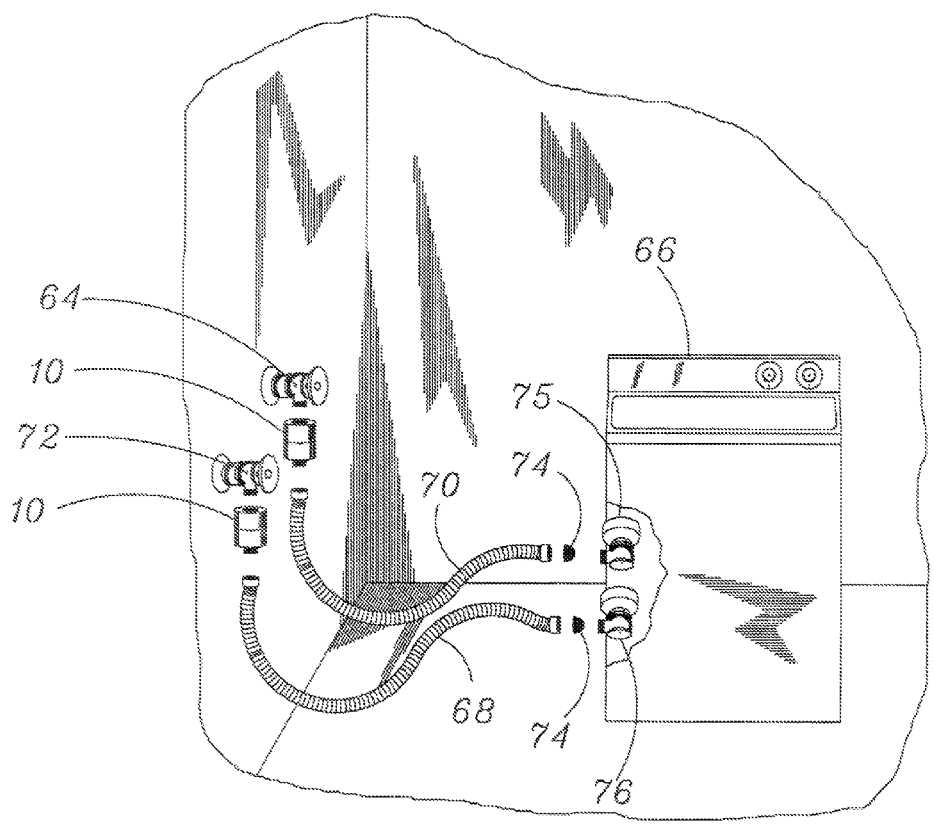
FIG. 6 is a perspective exploded assembly view of flow shutoff valves with an appliance.

FIG. 6 illustrates the use of flow shutoff valves 10 with a home appliance such as a washing machine 66. Flexible hoses 68, 70 are coupled with the flow shutoff valves 10 which are in turn coupled with the standard manual valves 64, 72. In the circumstance that a flexible hose 68, 70 breaks, water pressure within the hose and correspondingly at the outlet 20 would drop to near zero gauge pressure. Under this circumstance, the flow shutoff valve 10 would close by having the valve element 34 moved to the second position. The corresponding valve 64, 72 must then be closed before flow is restored through the flow shutoff valve 10.

The hoses 68 and 70 have proximal ends adjacent the shutoff valve 10 and distal ends at the appliance 66 or other device. A line filter 74 may be located adjacent the distal end of each of the hoses 68 and 70, where they connect to the appliance solenoid valves, 75 and 76, and no line filter is located adjacent the proximal end of the hoses 68 and 70 or the flow shutoff valve 10. As indicated above, particles and hardness accumulate from a domestic water line. If there is a filter before the flow shutoff valve 10, there is the danger of sufficiently clogging the line filter enough that flow would never reach the shutoff velocity through the flow shutoff valve 10 to properly actuate with a break in the hose. By placing line filters after the hoses, the increased flow from a break would not be reduced by an upstream clogged line filter.

Figure 7:
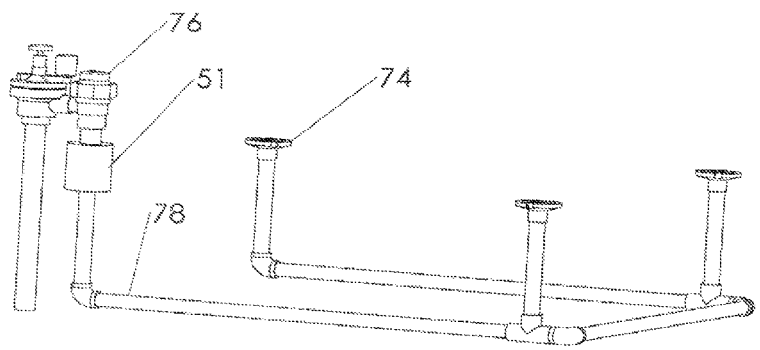
FIG. 7 is a perspective view of a flow shutoff valve with a sprinkler system.

FIG. 7 illustrates a sprinkler system including sprinklers 74, an anti-siphon valve 76 and sprinkler pipes 78. The motion damper 52 of the second embodiment has particular utility in the sprinkler system of FIG. 7. When the anti-siphon valve 76 is closed, the anti-siphon operates to release pressure and drain some of the sprinkler pipe 78. Therefore, when the anti-siphon valve is again opened, there is the possibility that the sprinkler piping 78, and correspondingly the outlet 20, will be at near zero gauge pressure until filled by line water. Without slowing the closure of the valve, this condition could prematurely close the shutoff valve.

Thus, relatively simple, inexpensive and reliably responsive and self cleaning flow shutoff valving has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A fluid flow shutoff valve, comprising:
   a housing having an inlet, an outlet and a passage therebetween, the passage including a valve seat thereabout, a first, cylindrical section and a second section;
   a valve element slidably mounted in the passage between a first upstream position and a second downstream position, the valve element including a cavity opening toward the inlet, at least one restrictive orifice in the valve element located at a downstream end of the cavity and extending through a wall of the valve element from the cavity to the periphery of the valve element, and a sealing surface located at a downstream end of the valve element, the sealing surface being engageable with the valve seat to prevent flow through the valve; and
   a spring in compression between the housing and the valve element biasing the valve element toward the inlet and away from the valve seat;
   wherein when the valve element is in the first position the sealing surface is displaced from the valve seat and the first cylindrical section covers the restrictive orifice, thereby preventing flow through the valve, and when the valve element is in the second position the sealing surface engages the valve seat and prevents flow through the valve and the restrictive orifice is open into the second section.

2. The flow shutoff valve of claim 1, the at least one restrictive orifice being sized to generate a pressure drop creating a force on the valve element which is greater than the force of the spring when the valve element is in the second position if backpressure at the outlet drops to zero gauge pressure and the spring being arranged to have a spring force with the valve element in the second position which is less than the total force of the water line pressure on the valve element with the backpressure at the outlet at zero gauge pressure.

3. The flow shutoff valve of claim 1, the valve element further including an intermediate position between the first and second positions, the intermediate position being with the sealing surface displaced from the valve seat and the restrictive orifice being open into the second section.

4. The flow shutoff valve of claim 1, further comprising a flexible hose having a proximal end threaded to the outlet and a distal end, the inlet and outlet having female and male threads, respectively.

5. The flow shutoff valve of claim 4, further comprising a line filter adjacent the distal end of the flexible hose and no line filter adjacent the proximal end of the hose or the flow shutoff valve.

6. The flow shutoff valve of claim 1, further comprising a motion damper including a motion resistance pot operatively coupled with the housing and the valve element.

7. The flow shutoff valve of claim 6, the motion resistance of the motion resistance pot being progressive with displacement.

8. The flow shutoff valve of claim 7, further comprising an anti-siphon valve coupled with the inlet.

9. The flow shutoff valve of claim 6, the motion resistance pot including a cavity fixed relative to one of the housing and the valve element and a plunger fixed relative to the other of the housing and the valve element, the plunger having an increasing cross-sectional area with increasing distance from the free end of the plunger for a first distance.

10. A fluid flow shutoff valve, comprising:
a housing having an inlet, an outlet and a passage therebetween, the passage including a valve seat thereabout, a first, cylindrical section and a second section;
a valve element slidably mounted in the passage between a first upstream position and a second downstream position with an intermediate position therebetween, the valve element including a sealing surface located at a downstream end of the valve element, the sealing surface being engageable with the valve seat to prevent flow through the valve, and a cylindrical wall slidably engaging the first cylindrical section;
a flow restrictive passage in the valve element in fluid communication with the inlet; and
a restrictive orifice extending through the cylindrical wall;
a spring in compression between the housing and the valve element biasing the valve element toward the inlet and away from the valve seat;
wherein when the valve element is in the first position the sealing surface is displaced from the valve seat and the first cylindrical section covers the restrictive orifice, preventing flow through the valve, when the valve element is in the intermediate position the sealing surface is displaced from the valve seat, the first cylindrical section does not cover the restrictive orifice, and flow through the valve is open, and when the valve element is in the second position the sealing surface engages the valve seat and prevents flow through the valve.

11. The flow shutoff valve of claim 10, the flow restrictive passage being through the valve element.

12. The flow shutoff valve of claim 10, the at least one restrictive orifice being sized to generate a pressure drop creating a force on the valve element which is greater than the force of the spring when the valve element is in the second position if backpressure at the outlet drops to zero gauge pressure and the spring being arranged to have a spring force with the valve element in the second position which is less than the total force of the water line pressure on the valve element with the backpressure at the outlet at zero gauge pressure.

13. The flow shutoff valve of claim 10, further comprising a flexible hose having a proximal end threaded to the outlet and a distal end, the inlet and outlet having female and male threads, respectively.

14. The flow shutoff valve of claim 13, further comprising a line filter adjacent the distal end of the flexible hose and no line filter adjacent the proximal end of the hose.

15. The flow shutoff valve of claim 10, further comprising a motion damper including a motion resistance pot operatively coupled with the housing and the valve element.

16. The flow shutoff valve of claim 15, the motion resistance pot including a cavity fixed relative to one of the housing and the valve element and a plunger fixed relative to the other of the housing and the valve element, the plunger having an increasing cross-sectional area with increasing distance from the free end of the plunger for a first distance.

17. The flow shutoff valve of claim 16, further comprising an anti-siphon valve coupled with the inlet.

18. The flow shutoff valve of claim 15, the motion resistance of the motion resistance pot being progressive with displacement.

* * * * *